UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

ZINC PERBORATE.

No. 824,798.     Specification of Letters Patent.     Patented July 3, 1906.

Application filed February 17, 1905. Serial No. 246,070.

*To all whom it may concern:*

Be it known that I, OTTO LIEBKNECHT, a subject of the German Emperor, and a resident of Frankfort-on-the-Main, Germany, have invented a certain new and useful Composition of Matter, of which the following is a specification.

My invention relates to the production of zinc perborate as a new and useful composition of matter. The process for producing the same and the order of steps in causing the reactions of said process may be varied and form no part of this invention, the essential feature thereof being the production of zinc perborate as a new composition of matter.

I shall describe the process I prefer for producing zinc perborate, first stating the same generally, together with some variations of the same, and then giving a specific example.

The process I prefer comprises generally the causing of an alkali peroxid, such as sodium peroxid, boracic acid, and either zinc sulfate or zinc chlorid to react with one another. The boracic acid may be stirred into a solution of zinc sulfate or zinc chlorid, and while the solution is being agitated the alkali peroxid is added, the solution, if necessary, being cooled during the addition of the alkali peroxid, or the process may be varied by adding the alkali peroxid to water, the solution being kept cool during the addition, then adding a solution of zinc sulfate or zinc chlorid, and finally stirring in the boracic acid. In either case the resulting compound should be filtered, washed with water, dried, and the remaining pulverized material decanted with water until all of the sulfate, chlorid, or other salt of the alkali peroxid used is in solution. Another variation in the process may be carried out by rubbing sodium perborate and zinc sulfate or zinc chlorid together with water, whereby a change takes place into zinc perborate, and a sodium-salt or a sodium-perborate solution may be decomposed by a mineral acid into the sodium salt of the mineral acid and perboracic acid or its equivalent boracic acid and hydrogen peroxid. To this is added a solution of zinc sulfate or zinc chlorid, zinc perborate precipitating while stirring with a not too highly-concentrated soda-caustic solution. Another variation may be performed by rubbing a freshly-prepared moist zinc peroxid hydrate together with finely-pulverized boracic acid, thus obtaining a thin paste of zinc perborate.

The following example will more clearly illustrate the general process: Two hundred and eighty-seven parts of zinc sulfate ($ZnSO_4 + 7Aq$) are dissolved in about six hundred parts of water. Then while stirring the mixture sixty-two parts of finely-pulverized boracic acid are added and then eighty parts of sodium peroxid, (ninety-seven per cent.,) the mixture being cooled and stirred vehemently, preferably with a screw stirrer, during the addition of the sodium peroxid. The resulting compound is stirred for about one-half an hour and then allowed to cool to 5° to 10° centigrade. It is then filtered off, washed with water, and dried, first in the air and then in a vacuum-closet, the pulverized substance being decanted with water until all the sodium sulfate is in solution.

The zinc perborate resulting from the example given above is a white amorphous loose powder, especially useful for dermatological purposes and contains a decidedly higher amount of oxygen than zinc oxid, the yield of oxygen being not far from the theoretical.

There are a series of perborates coming within the scope of the invention. For instance:

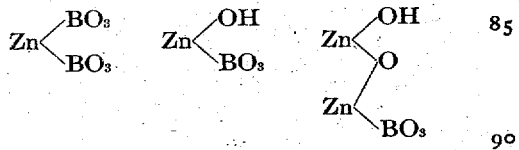

The perborate which results from the above example most nearly approximates the third formula; but by varying the proportions of the raw materials mixtures responding to all three formulas can be obtained. I therefore do not restrict myself to any particular formula.

Having described my invention, what I claim, and desire to secure by Letters Patent of the United States, is—

As a composition of matter, zinc perborate in the form of a white, amorphous, loose
5 powder containing more oxygen than zinc oxid.

In witness whereof I have hereunto signed my name in the presence of two subscribing witnesses.

OTTO LIEBKNECHT.

Witnesses:
  HORST ZIEGLER,
  CARL GRUND.

---

Correction in Letters Patent No. 824,798.

It is hereby certified that in Letters Patent No. 824,798, granted July 3, 1906, upon the application of Otto Liebknecht, of Frankfort-on-the-Main, Germany, for an improvement in "Zinc Perborates," an error occurs in the printed specification requiring correction, as follows: In line 76, page 1, the word "ioose" should read *loose;* and that the said Letters Patent should be read with this correction therein that the same may conform to the record of the case in the Patent Office.

Signed and sealed this 24th day of July, A. D., 1906.

[SEAL.]

F. I. ALLEN,
*Commissioner of Patents.* claim, and desire to secure by Letters Patent of the United States, is—

As a composition of matter, zinc perborate in the form of a white, amorphous, loose powder containing more oxygen than zinc oxid.

In witness whereof I have hereunto signed my name in the presence of two subscribing witnesses.

OTTO LIEBKNECHT.

Witnesses:
HORST ZIEGLER,
CARL GRUND.

---

Correction in Letters Patent No. 824,798.

It is hereby certified that in Letters Patent No. 824,798, granted July 3, 1906, upon the application of Otto Liebknecht, of Frankfort-on-the-Main, Germany, for an improvement in "Zinc Perborates," an error occurs in the printed specification requiring correction, as follows: In line 76, page 1, the word "ioose" should read *loose;* and that the said Letters Patent should be read with this correction therein that the same may conform to the record of the case in the Patent Office.

Signed and sealed this 24th day of July, A. D., 1906.

[SEAL.]

F. I. ALLEN,
*Commissioner of Patents.*

Correction in Letters Patent No. 824,798.

It is hereby certified that in Letters Patent No. 824,798, granted July 3, 1906, upon the application of Otto Liebknecht, of Frankfort-on-the-Main, Germany, for an improvement in "Zinc Perborates," an error occurs in the printed specification requiring correction, as follows: In line 76, page 1, the word "ioose" should read *loose;* and that the said Letters Patent should be read with this correction therein that the same may conform to the record of the case in the Patent Office.

Signed and sealed this 24th day of July, A. D., 1906.

[SEAL.]

F. I. ALLEN,
*Commissioner of Patents.*